United States Patent
Nakatani et al.

(10) Patent No.: US 6,603,572 B1
(45) Date of Patent: Aug. 5, 2003

(54) IMAGE READING APPARATUS, METHOD AND MEMORY MEDIUM THEREFOR

(75) Inventors: Akihiko Nakatani, Yokohama (JP); Tadashi Yamamoto, Yokohama (JP); Kiyoshi Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/265,818

(22) Filed: Mar. 10, 1999

(30) Foreign Application Priority Data

Mar. 12, 1998 (JP) .......................... 10-061279

(51) Int. Cl.[7] .......................... G06F 15/00; G06F 13/00
(52) U.S. Cl. .................. 358/1.2; 358/1.12; 358/496; 358/497; 358/498; 358/486; 358/472
(58) Field of Search .................. 358/1.2, 472, 496, 358/497, 486, 505, 474, 524, 444, 494, 483, 498

(56) References Cited

U.S. PATENT DOCUMENTS

| | | | | |
|---|---|---|---|---|
| 4,692,812 A | * | 9/1987 | Hirahara et al. | 358/258 |
| 5,181,128 A | * | 1/1993 | Fukatsu | 358/486 |
| 5,283,668 A | | 2/1994 | Hiramatsu | 358/474 |
| 5,477,341 A | * | 12/1995 | Obata | 358/448 |
| 5,592,304 A | * | 1/1997 | Udagawa et al. | 379/313 |
| 5,805,308 A | * | 9/1998 | Tanka et al. | 358/486 |
| 5,880,852 A | * | 3/1999 | Asano et al. | 358/296 |
| 5,987,194 A | | 11/1999 | Kaneko | 382/323 |
| 6,014,229 A | * | 1/2000 | Yun | 358/449 |
| 6,091,514 A | * | 7/2000 | Hasegawa et al. | 358/296 |
| 6,144,778 A | * | 11/2000 | Beauchamp et al. | 382/318 |

FOREIGN PATENT DOCUMENTS

| | | |
|---|---|---|
| EP | 0 744 860 | 5/1996 |
| EP | 0 833 493 | 9/1997 |
| EP | 0 901 273 | 8/1998 |
| WO | WO 95/26607 | 10/1995 |

* cited by examiner

Primary Examiner—Edward Coles
Assistant Examiner—Alan Rahimi
(74) Attorney, Agent, or Firm—Fitzpatrick, Cella, Harper & Scinto (57) ABSTRACT

In reading an original by mounting reading means (scanner unit) on a recording apparatus, the advancing width of the original is so reduced that the reading bands k, k+l, . . . , are partially overlapped. For example in the color image reading, in generating the data of the (k+1)-th band, the data of a range overlapped with the k-th band are corrected by the data of the k-th band (for example by simple averaging), thereby achieving image reading without bandwise density fluctuation regardless of the reading mode and the original size.

30 Claims, 7 Drawing Sheets

< NON-OVERLAP READING >

FIG. 7B

< OVERLAP READING >

FIG. 8

IMAGE READING APPARATUS, METHOD AND MEMORY MEDIUM THEREFOR

BACKGROUND OF THE INVENTION

1. Field of the Invention

The present invention relates to an image reading apparatus, an image reading method and a memory medium therefor.

2. Related Background Art

In the conventional image processing apparatus, there is already known a printer which receives data from a computer and forms a record on a recording sheet with a recording head, based on thus received data. Such printer is recently provided with not only the recording function but also a function of reading the image data on an original with a scanner unit. Such image processing apparatus is so constructed as to execute both the recording function and the original reading function by mounting a recording head or a scanner unit on a carriage and utilizing the recording sheet transporting system for both functions. Thus, in such image processing apparatus, the recording function is achieved by detachably mounting a recording head of dot impact type, thermal transfer type or ink jet type on the carriage and moving such recording head by moving means along the recording sheet, while the reading function is achieved by replacing the recording head with a scanner unit on the carriage and moving the scanner unit along the original.

The conventional original reading with such scanner unit is executed in one pass for each reading band with a green light source in case of a monochromatic scanner unit, and, in case of a full-color scanner unit, the reading is executed in succession with red, green and blue light sources. After the reading of one band, the original is advanced by the width of the band, and the above-explained operation is repeated until a reading area requested by the user is covered.

However, such conventional original reading method has been associated with insufficient image quality, because of so-called bandwise fluctuation, resulting from the matching error with the reference data caused by a fluctuation in the distance between the original and the scanner. The optical system constituting the inexpensive reading means such as th canner mentioned above can only be constituted with inexpensive lenses and without an illuminating system of a high positional precision, and it is also difficult to apply an adjusting step. Also the mechanical precision of the recording apparatus itself is involved, so that it has been difficult to eliminate, by mechanical adjustment only, the bandwise fluctuation resulting from the variation in the distance between the original and the scanner.

Such bandwise fluctuation appears regardless of the requested reading mode or size and becomes fatal in the optical character recognition or in the recording of the photograph size.

SUMMARY OF THE INVENTION

The object of the present invention is to achieve image reading of high quality, without unevenness.

The above-mentioned object can be attained, according to an aspect of the present invention, by an image reading apparatus comprising reading means for reading the image on an original, movement means for causing a relative movement between the reading means and the original in such a manner that the reading means executes an overlapped reading of the image on the original, setting means for setting the reading range of the reading means, and control means for controlling the overlapped reading range by the reading means according to the reading range set by the setting means.

According to an another aspect of the present invention, there is provided an image reading apparatus comprising reading means for reading the image on an original, movement means for causing a relative movement between the reading means and the original in such a manner that the reading means executes an overlapped reading of the image on the original, setting means for setting the reading color of the reading means, and control means for controlling the overlapped reading range by the reading means according to the reading color set by the setting means.

According to still another aspect of the present invention, there is provided an image reading apparatus comprising reading means for reading the image on an original in a main scanning direction with a predetermined reading width, setting means for setting the reading mode by the reading means, movement means for causing a relative movement in the main scanning direction and in the sub scanning direction between the reading means and the original, and control means for causing the reading means to read the image on the original with the predetermined reading width while causing the movement means to effect a relative movement in the sub scanning direction between the reading means and the original, then causing the movement means to effect a relative movement of an amount smaller than the predetermined reading width in the main scanning direction between the reading means and the original, and causing the reading means to read the image on the original with the predetermined reading width while causing the movement means to effect a relative movement in the sub scanning direction between the reading means and the original, wherein the control means is adapted to vary the amount of the relative movement in the main scanning direction according to the reading mode set by the setting means.

The above-described configurations allow to realize image reading of high quality without unevenness.

Further objects, features and advantages thereof, will become apparent from the following detailed description of embodiments of the present invention, which is to be taken in conjunction with the attached drawings.

DESCRIPTION OF THE PREFERRED EMBODIMENTS

Figure 1:
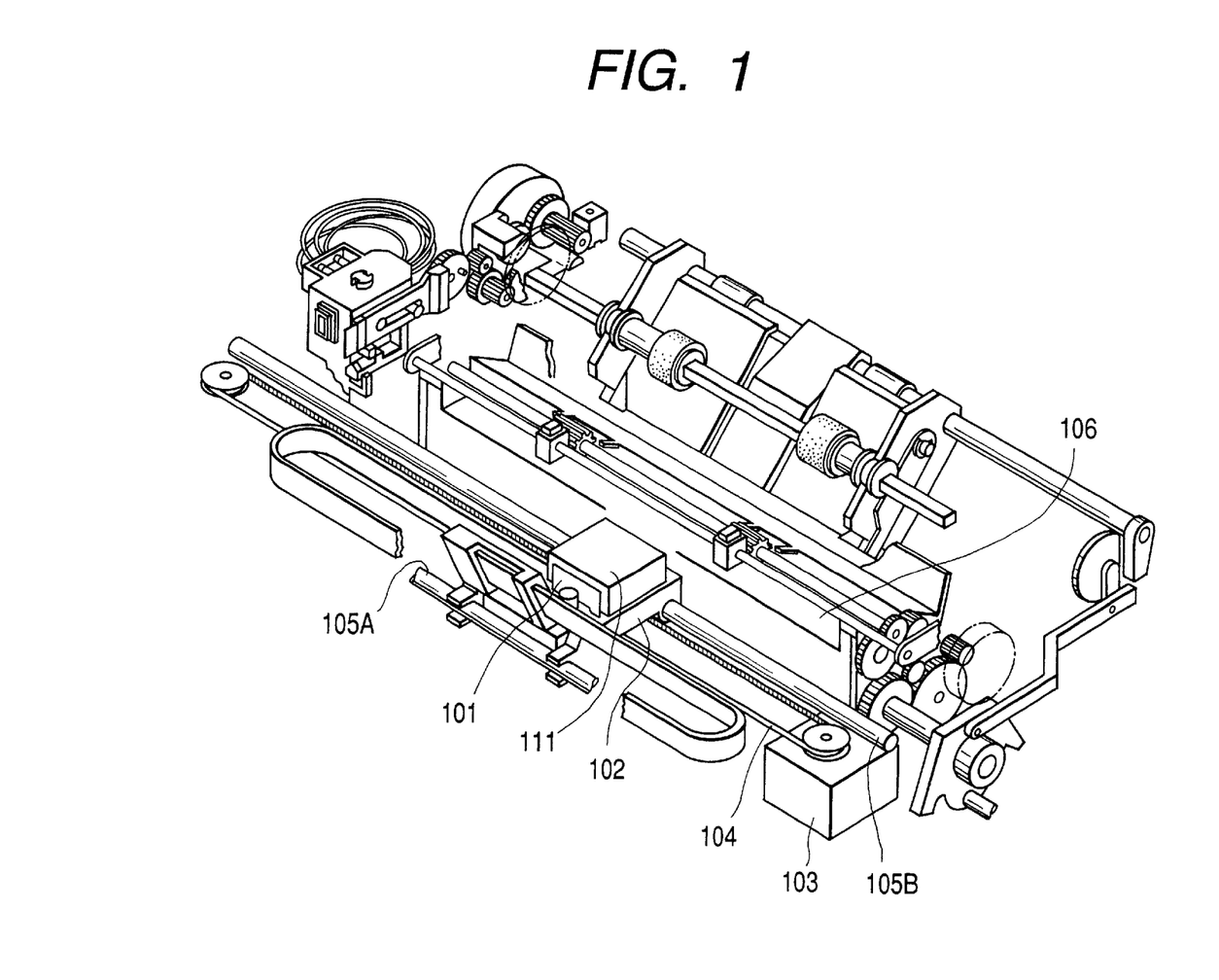
FIG. 1 is an external view of an image processing apparatus embodying the present invention.

FIG. 1 is an external view of an image processing apparatus embodying the present invention.

The image processing apparatus of the present embodiment is directed, in particular, to an ink jet recording apparatus 50, which incorporates a controller 5 (FIG. 3) and an operation control unit 8 (FIG. 3) for controlling the entire apparatus 50, and a memory 25 (FIG. 3) storing a control program to be executed by the operation control unit 8. The memory 25 may also be constituted for example by a hard disk, or a non-volatile ROM.

Referring to FIG. 1, a carriage 102 supports a scanner unit 111 (original reading means) for reading the image. The scanner unit 111 can be replaced, on the carriage 102, with a recording head 101 (recording means, not shown) for forming a recording on a recording sheet. The carriage 102 moves in the axial direction of a platen 106 (original advancing means), which supports the recording sheet or the original to be read, by a drive belt 104 driven by a carriage motor 103. The carriage 102 is guided by two parallel guide shafts 105A, 105B.

When the recording head 101 is mounted on the carriage 102, an image or a character is recorded on the recording sheet supported on the platen 106, while, when the scanner unit 111 is mounted on the carriage 102, the scanner unit 111 moves in the axial direction of the platen 106 along the original supported thereon, thereby effecting the image reading.

Figure 2:
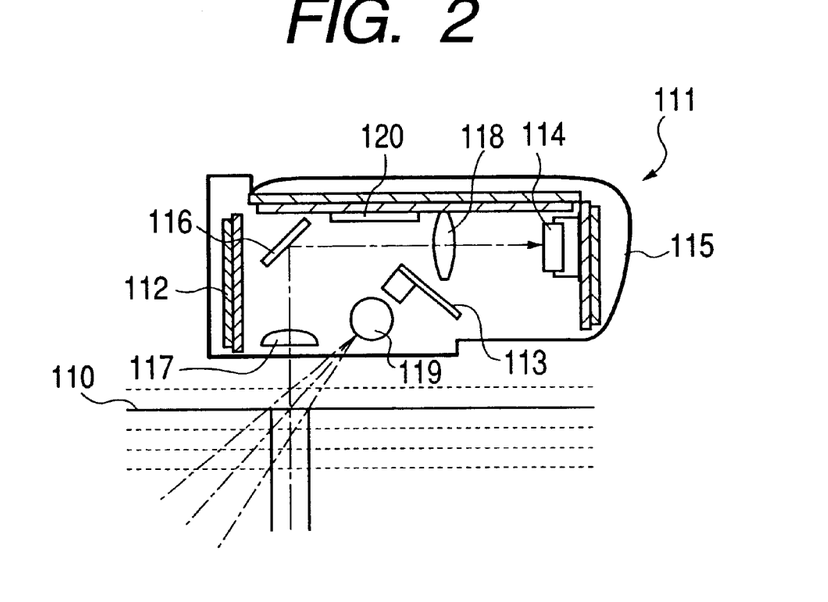
FIG. 2 is a view showing the configuration of a scanner unit.

FIG. 2 shows the structure of the scanner unit 111, which is covered with a substantially rectangular cover member 115. Inside the cover member 115 there is provided a circuit board 112, on which mounted are principal components such as an LED 113 for illuminating the original 110 on the platen 106, a photosensor 114 for effectiving photoelectric conversion of the light reflected from the image on the original 110, a mirror 116, a field lens 117, an imaging lens 118, a rod lens 119, an image processing correction IC 120 for effecting circuit control, A/D conversion and image processing, and electrical components such as resistors, capacitors, coils, oscillators etc. (not shown).

The image data processed by the image process correction IC 120 are transferred to the ink jet recording apparatus 50 and also transferred to a host computer 11 (FIG. 3) to be explained later.

Figure 3:
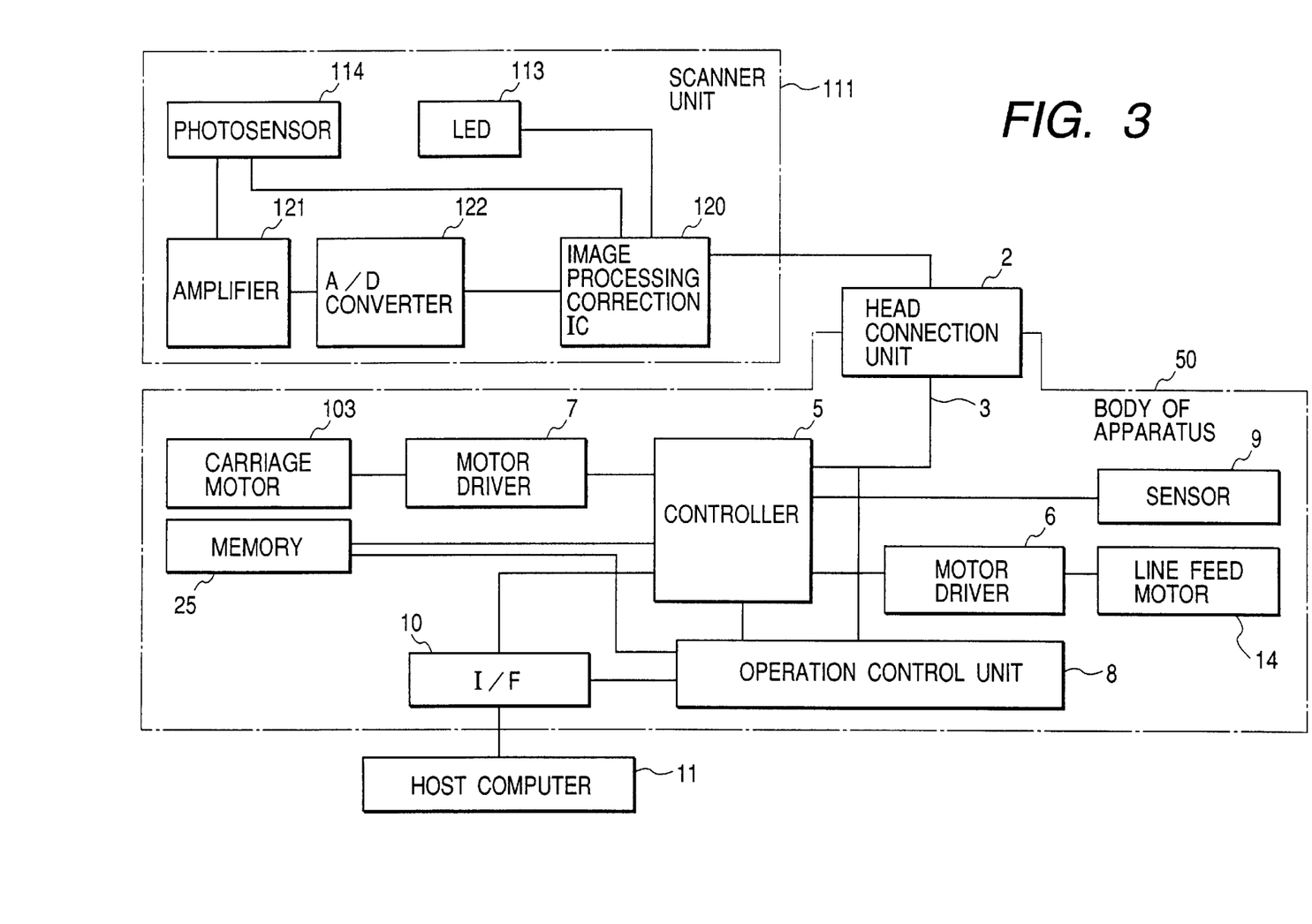
FIG. 3 is a block diagram of an image processing apparatus embodying the present invention.

FIG. 3 shows the entire configuration of the ink jet recording apparatus 50.

The ink jet recording apparatus 50 shown in FIG. 3 shows a state in which the scanner unit 111 is mounted on the carriage 102 shown in FIG. 1, and is connected to a host computer 11.

The ink jet recording apparatus 50 is provided with a carriage 102 (FIG. 1) for supporting the scanner unit 111 or a recording head (not shown), a head connection unit 2 contained in the carriage 102 and to be connected to the scanner unit 111 or the recording head, a carriage motor 103 for moving the carriage 102 in the horizontal direction, a motor driver 7 for controlling the function of the carriage motor 103, a line feed motor 14 for rotating the cylindrical platen 106 (FIG. 1), a motor driver 6 for controlling the function of the line feed motor 14, and a sensor 9 for detecting whether the recording sheet for image recording or the original for image reading is set and also detecting whether the carriage is set at a home position.

The ink jet recording apparatus 50 is further provided with an I/F 10 for connection to the host computer 11, a memory 25 for storing control programs, printing fonts, image data received from the scanner unit 111 and image data received from the host computer 11, and a controller 5 to which the motor drivers 6, 7, the sensor 9, the I/F 10 and the memory 25 are connected. Also the heat connection unit 2 is connected to the controller 5 through a head connection line 3. The controller 5 controls, in cooperation with the operation control unit 8, the carriage motor 103 and the line feed motor 104 through the motor drivers 6, 7 according to the control program in the memory 25 and also controls the sensor 9 for detecting whether the recording sheet or the original to be read is set on an unrepresented sheet setting table, and whether the carriage 102 is in a start position.

The scanner unit 111 is provided with an LED 113, a photosensor 114, an amplifier 121 for amplifying the signal detected by the photosensor 114, an A/D converter 122 for effecting analog/digital (A/D) conversion of the signal amplified by the amplifier 121, and an image process correction IC 120.

In the following there will be explained the function of the ink jet recording apparatus 50 in a state as the recording apparatus.

At first the controller 5 receives recording data for characters or an image, from the host computer 11 through the I/F 10. The reception of the recording data is executed under the control of the host computer 11 and the operation control unit 8. The controller 5 processes the received recording data for recording by the recording head onto the recording sheet.

Also, under the control of the operation control unit 8, the controller 5 transmits the recording data to the recording head through the head connection line 3 and the head connection unit 2, and the recording head record the transmitted data on the recording sheet.

In the following there will be explained the function of the driving mechanism of the ink jet recording apparatus 50.

The platen 106 (FIG. 1) is rotated by the line feed motor 14 under the control of the operation control unit 8, the controller 5 and the motor driver 6, thereby advancing the recording sheet, supported on the platen 106, in the rotating direction thereof, and also serves as a support member for supporting the recording sheet at the ink deposition from the recording head.

The carriage 102 (FIG. 1) supports and transports the recording head along the recording sheet in case of recording, and supports and transports the scanner unit 111 along the original to be read in case of image reading. The carriage 102 is moved along the axial direction of the platen 106 by the rotation of the carriage motor 103 under the control of the operation control unit 8, the controller 5 and the motor driver 7.

In the following there will be explained the function of the ink jet recording apparatus 50 in a state as the image reading apparatus.

When the ink jet recording apparatus 50 is used as the image reading apparatus, the scanner unit 111 is mounted on the carriage 102 and scans the original to be read, along the axial direction of the platen 106.

The LED 113 illuminates the original, and the light reflected from the image or characters contained in the original is detected and converted into a signal by the photosensor 114 capable of photoelectric conversion. The signal detected by the photosensor 114 is amplified by the amplifier 121 and is transmitted to the A/D converter 122, which executes A/D conversion of the signal amplified by the amplifier 121 and transmits the obtained digital data to the image process correction IC 120. The digital data are subjected in the image process correction IC 120 to image processing such as shading correction, binarization etc. and are transmitted as image data to the controller 5.

The image data are transmitted to the host computer 11 through a route inverse to that of the recording data in case of image recording. More specifically, they are transmitted from the image process correction IC 120 to the host computer 11 through the head connection unit 2, the head connection line 3, the controller 5 and the I/F 10.

In this operation, the controller 5 processes the image data, received from the image process correction IC 120, into a format that can be easily transmitted by the I/F 10 or easily processed in the host computer 11, and transmits the image data to the host computer 11 under the control of the operation control unit 8.

In the following there will be explained the function of the driving mechanism of the ink jet recording apparatus 50, in the image reading state. The function is almost same as that in the recording operation.

The platen 106 is rotated by the line feed motor 14 under the control of the operation control unit 8, the controller 5 and the motor driver 6, thereby advancing the original, supported on the platen 106, in the rotating direction thereof, and also serves as a support member for supporting the original in the scanning operation therefor by the scanner unit 111.

The carriage 102 supports and transports the scanner unit 111 along the original to be read, whereby the scanner unit 111 reads the original. The carriage 102 is moved along the axial direction of the platen 106 by the rotation of the carriage motor 103 under the control of the operation control unit 8, the controller 5 and the motor driver 7.

The sensor 9 detects whether the original is set on an unrepresented paper supporting table, and whether the carriage 102 is at the start position.

In the following there will be explained, with reference to FIGS. 4 and 5, the method of processing for an image band read from the original. The image processing sequence explained in the following is executed by the controller 5 and the operation control unit 8 according to the control program stored in the memory 25.

Figure 4:
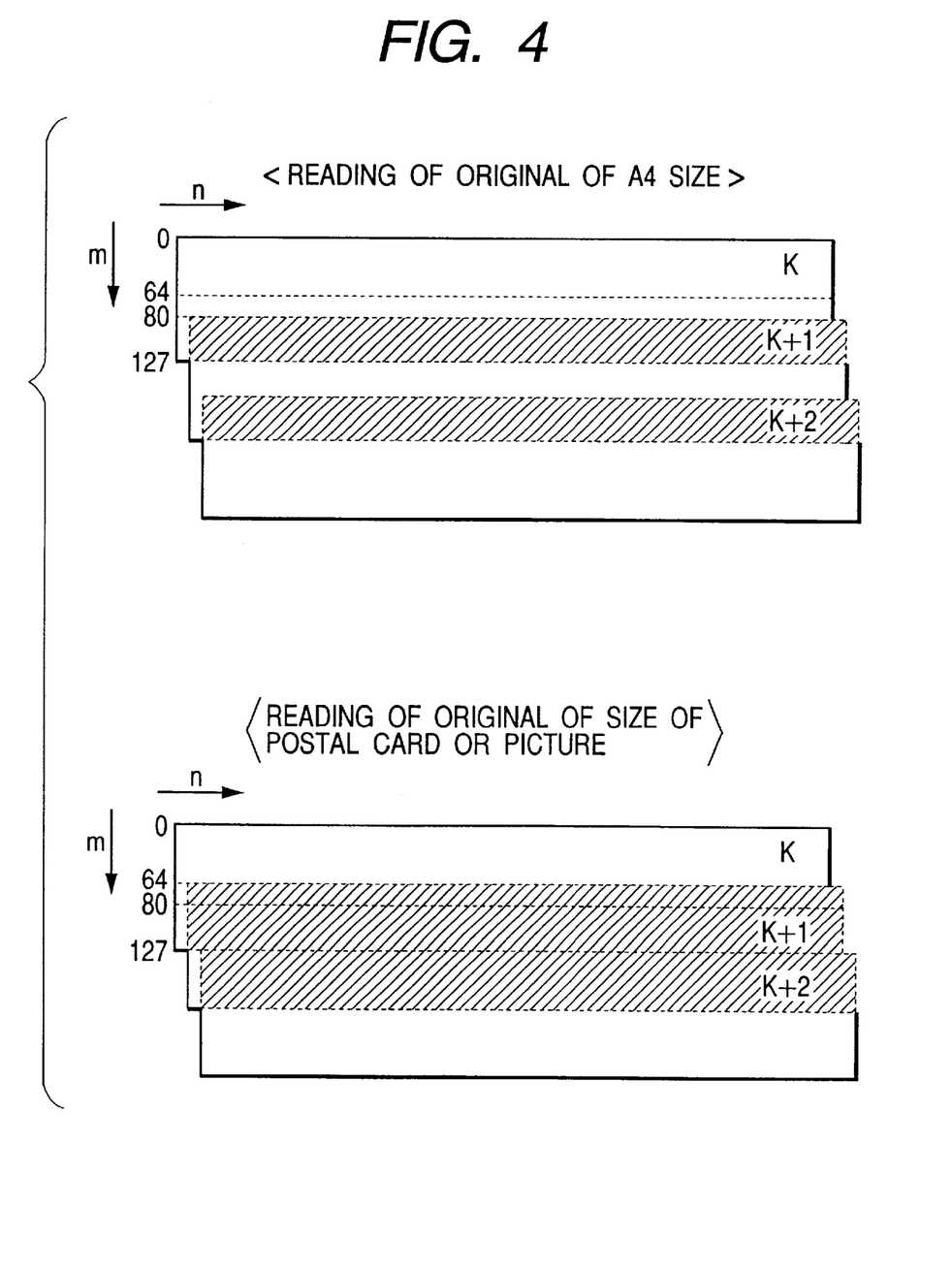
FIGS. 4 and 5 are views showing the mode of overlapped reading.
Figure 5:
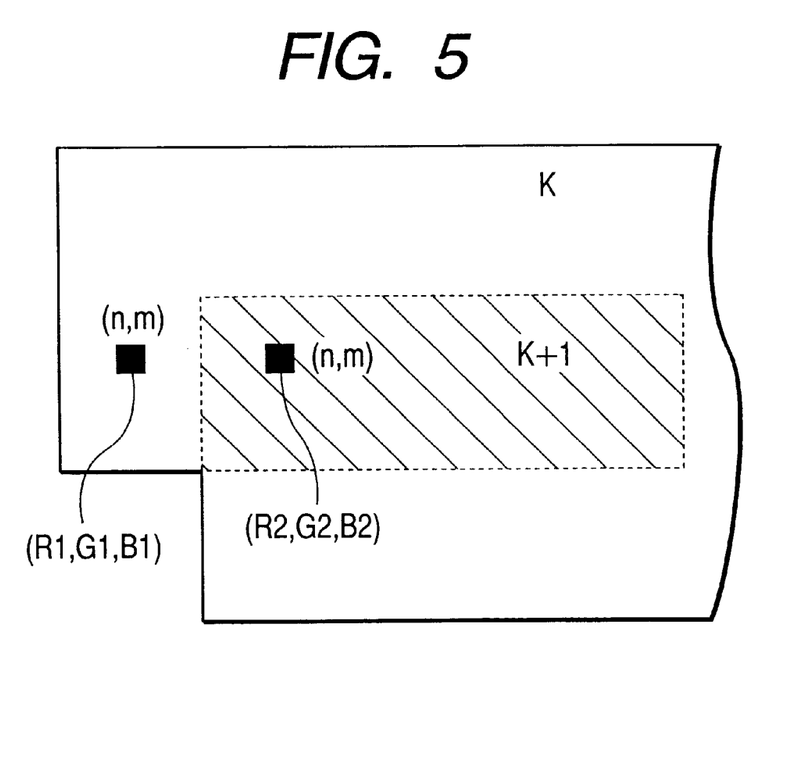

FIG. 4 shows an example of the band read by the scanner unit 111 shown in FIG. 1, and FIG. 5 shows an example of the overlapped reading area within the band read by the scanner unit 111. The left ends of the bands shown in FIGS. 4 and 5 are in fact at a same position, but, for the purpose of clarity, the bands are displaced to the right in such a manner that the left ends of the bands do not mutually overlap.

In case of actual original reading with the scanner unit 111, it is mounted on the carriage 102 and executes the original reading by movement in the moving direction of the carriage by the drive belt 104 and the motor 103. In the conventional reading method, after the reading of a first band, the original is advanced by a width equal to the reading width, namely by the width of the first band, and an original is read by thereafter repeating such reading operation. In case of monochromatic reading, the original reading is executed by turning on the green light source, and, in case of full-color original reading, the original reading executed by turning on the red, green and blue light sources in succession.

In the present embodiment, in case of reading the original for example A4 size, after the reading of a first band (having a width of 128 pixels) by the scanner unit 111, the original is advanced by a width of (128−48)=80 pixels, and, in the original reading of a next band, an area of 48 pixels in the first band is read in overlapped manner. The band data belonging to the width of 48 pixels in the lower portion of the first band are stored in the memory 25 until the next band is read and the read overlapping data are subjected to the averaging process to be explained later. The memory 25 is composed in the present embodiment of a RAM or a hard disk provided in the ink jet recording apparatus 50, and serves to temporarily store the read overlapping band data of one color in case of monochromatic image reading, or those of three colors in case of color image reading.

For example, in case of full-color reading of a band with a width of 128 pixels, at first the red (R) data of a k-th band are read with a width of 128 pixels as shown in FIG. 5 and the band data R1 constituting a lower portion of a width of 48 pixels having coordinates (n, m) (n being a natural number, m=80, 81, . . . , 126, 127) are stored in the memory 25. Then the green (G) data of the k-th band are read with a width of 128 pixels and the band data G1 constituting the lower portion of a width of 48 pixels having coordinates (n, m) (n being a natural number, m=80, 81, . . . , 126, 127)are stored in the memory 25 so as not to overlap with the band data R1, and the blue (B) data of the k-th band are read with a width of 128 pixels and the band data B1 constituting the lower portion of a width of 48 pixels having coordinates (n, m) (n being a natural number, m=80, 81, . . . , 126, 127) are stored in the memory 25 so as not to overlap with the band data G1 to R1.

Then the red (R) data, green (G) data and blue (B) data of a (k+1)-th band are read with a width of 128 pixels and the red (R) data R2, green (G) data G2 and blue (B) data B2 constituting an upper portion of a width of 48 pixels having coordinates (n, m) (n being a natural number, m=0, 1, 2, . . . , 46, 47) are stored in the memory 25, and the band data R1, G1, B1 and those R2, G2, B2 are subjected to an averaging process to obtain averaged band data R0, G0, B0. For using the memory 25 in an efficient manner, the memory area used by the band data of the lower 48 pixels of the (k+1)-th band. The entire process can be executed smoothly by using the area of the memory 25, used for storing the band data, in a manner similar to a ring buffer.

The averaged band data R0 can be derived by R0=(R1+R2)/2. Similarly the band data G0 is derived by G0=(G1+G2)/2, and the band data B0 is derived by B0=(B1+B2)/2.

The thus averaged band data R0, G0, B0 constitute the data obtained by reading the original, and such averaging process is repeated over the requested reading range of the original to obtain the read image data of one original.

The above-described averaging process, applied to the band data, can reduce the noise level by about 3 dB in comparison with the case without such averaging. Thus the overlapped read of n times can reduce the noise level of the image by (dB)=10 ×log(n). Therefore a high-quality image with a reduced noise level can be obtained by effecting the overlapped reading by a necessary number of times.

Figure 6:
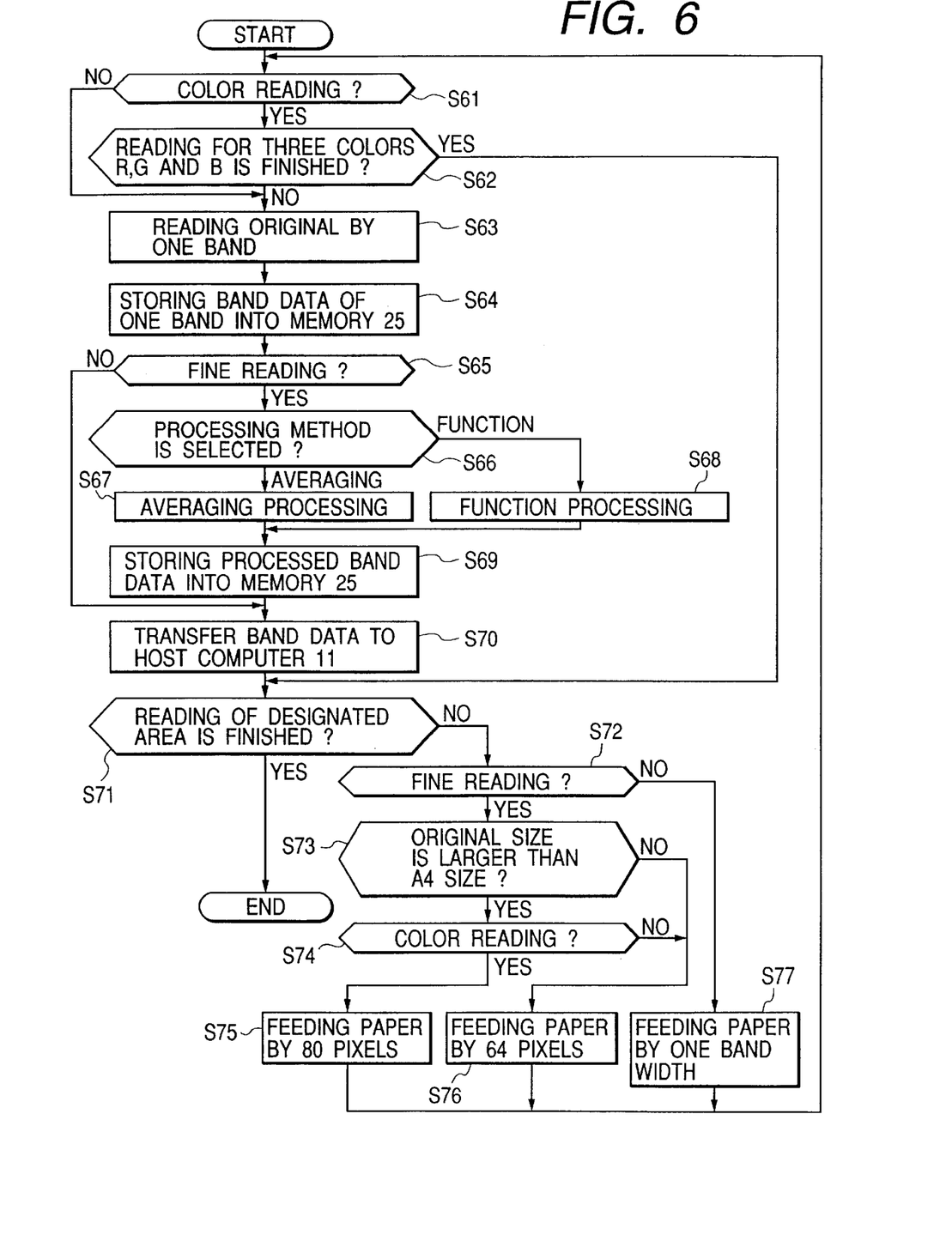
FIG. 6 is a flow chart showing the control sequence of image reading.

FIG. 6 shows the details of the control program stored in the memory 25 and executed by the controller 5 and the operation control unit 8.

At first there is discriminated whether color reading is to be executed by the scanner unit 111 (step S61), and, if not, the sequence skips to a step S63 to be explained later, but, if to be executed, there is discriminated whether the band data of three colors or red, green and blue have already been read (step S62).

If the band data of three colors have been read, the sequence proceeds to a step S71 to be explained later, but, if not read, the original image of a band is read (step S63) and the band data of such one band are stored in the memory 25 (step S64).

Then there is discriminated whether fine reading is to be executed (step S65). The fine reading means the overlapped reading of the band data, and the user can set in advance, whether or not to execute the fine reading, in the ink jet recording apparatus 50 or through the host computer 11.

If the step S65 identifies that the fine reading is not to be executed, the sequence jumps to a step S70 to be explained later, but, if the fine reading is to be executed, there is selected an averaging process or a function process for processing the band data after the fine reading (step S66).

If the step S66 selects the averaging process, the band data after the fine reading are subjected to the averaging process as explained in the foregoing (step S67). On the other hand, if the function process is selected, the band data after the fine reading are subjected to a function process to be explained later (step S68). The function process may be so set as to vary the grade of fine reading according to the kind of the function.

Figure 7A:
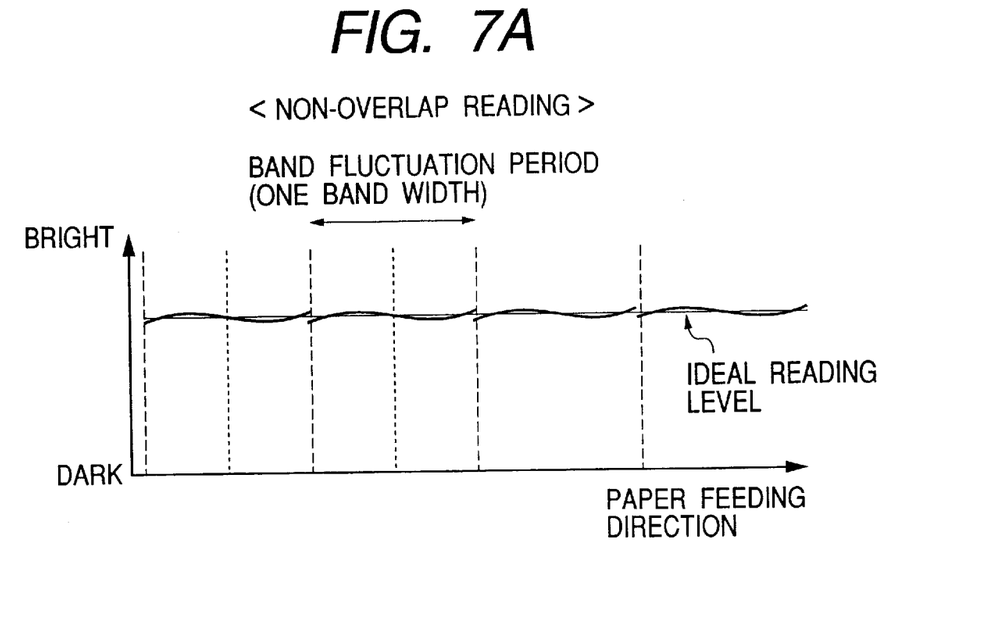
FIGS. 7A and 7B are views showing bandwise fluctuation and a function relating thereto.
Figure 7B:
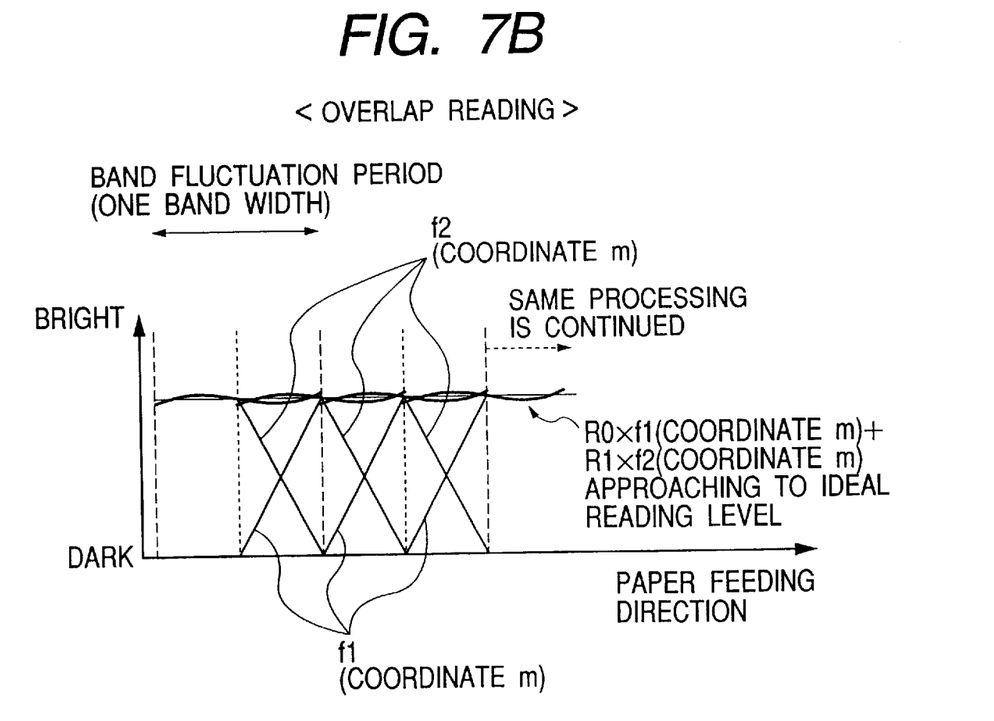

FIGS. 7A and 7B show the bandwise fluctuation and an example of the function to be used for such bandwise fluctuation. FIG. 7A shows the bandwise fluctuation in case the fine reading is not executed, and FIG. 7B shows the bandwise fluctuation in case of fine reading and an example of the function to be used for such bandwise fluctuation.

The function process executed in FIG. 7B consists of applying a function f1 (coordinate m) to the read data (R1) of coordinate m (m=80, 81, . . . , 126, 127) in the lower 48 pixels in the k-th band, then applying a function f2 (coordinate m) to the read data (R2) of coordinate m (m=0, 1, . . . , 62, 63) in the upper 48 pixels in the (k+1)-th band, and taking the sum:

$$R0 = R1 \times f1 \text{ (coordinate } m\text{)} + R2 \times f2 \text{ (coordinate } m\text{)} \quad (1)$$

to obtain the band data R0 after the function process.

In the equation (1), the functions f1 (coordinate m) and f2 (coordinate m) are so selected as to satisfy a relation f1 (coordinate m)+f2 (coordinate m)=1. Examples of such function include a linear function, a (1−linear) function, a squared sine function and a squared cosine function.

The equation (1) may also be weighted according to trend of the bandwise fluctuation, and the functions f1 (coordinate m) and f2 (coordinate m) in such case may be such that f1+f2≠1.

Also in case of the function process explained above, there can be obtained a reduction in the noise level according to the function employed, and, by preparing plural functions, the user can set the fine reading of different levels, in the ink jet recording apparatus 50 or through the host computer 11.

Now referring to FIG. 6 again, the band data subjected to the averaging in the step S67 or subjected to the function process in the step S68 are stored in the memory 25 for processing of the next band data (step S69).

Subsequently, the band data stored in the memory 25 are transferred to the host computer 11 (step S70) and there is discriminated whether the designated area of the original has been read (step S71). If read, the sequence is terminated, but, if not yet read, there is discriminated whether the fine reading is executed (step S72).

If the step S72 identifies the fine reading, there is discriminated whether the original is of A4 size or larger size (step S73). The original size is detected for the following reason.

In case of reading an original of a size smaller than A4 size, for example of a postcard size of a photograph size, the reading area becomes smaller than that for the A4 size, so that the capacity of the memory 25 required for storing the read image data becomes smaller in the above-described reading sequence. Therefore, the size of the original to be read is detected in order to control the reading process so as to fully exploit the margin in the memory capacity, resulting from the difference in the original size.

More specifically, in case of reading the original of A4 size or larger, the width of overlapped reading in a band is selected as 48 pixels, but, in case of reading the original smaller than A4 size, the width is selected as 64 pixels. In this case there is considered a predetermined original size, but there may also be adopted such control that the width of overlapped reading becomes larger as the original reading range (namely carriage moving range) becomes smaller.

Also in the present embodiment, the width of overlapped reading is varied not only according to the original size but also whether the color reading is to be executed. Even for the original of a same A4 size, higher image quality is required for reading a monochromatic document original including a photograph or in case of optical character recognition (OCR) than in case of color image reading. In case of monochromatic image reading, the data amount is smaller in comparison with the case of color image reading, so that the capacity of the memory 25 required for storing the image data read in the above-described image reading sequence, as in the case of reading the smaller original. Therefore, there is discriminated whether the color image reading is to be executed, and the reading process is so controlled as to fully exploit the margin in the memory capacity, obtained in the monochromatic reading.

More specifically, in the color image reading mode, the width of overlapped reading in a band is selected as 48 pixels, but in the monochromatic image reading mode, the width is selected as 64 pixels.

Again referring to FIG. 6, if the step S73 identifies that the original size is smaller than A4 size, a step S76 advances the original by 64 pixels and the sequence then returns to the step S61. If the step S73 identifies that the original size is A4 size or larger, a step S74 discriminates whether the color reading is to be executed.

In case of the color reading, a step S75 advances the original by 80 pixels, and the sequence returns to the step S60. If the step S74 identifies that the color reading is not to be executed, the step S76 advances the original by 64 pixels and the sequence returns to the step S61.

On the other hand, if the step S72 identifies that the fine reading is not to be executed, the step S77 advances the original by a band width, because the overlapped reading is not executed, and the sequence then returns to the step S61.

As explained in the foregoing, the present embodiment executes overlapped reading of the band data, then applies averaging process or function process to the band data of the overlapping portion and suitably varies the width (range) of such overlapped reading, thereby eliminating the bandwise fluctuation and realizing high image quality.

The present embodiment has shown, as an example of color image reading, an averaging process for the band data of a width of 48 pixels, but it is applicable also to a case of overlapped reading of the band data contained in a lower band width corresponding to 1/n (n being a real number larger than 1) of the current band, and averaging the band data of a width corresponding to 1/n of the band.

Also in the present embodiment, the averaged band data R0 are derived by R0=(R1+R2)/2, but the averaging process may be conducted by any process of calculating the averaging of the overlapped band data, and, in case the overlapped band data for example consist of R1, R2 and R3, the band data R0 can be derived by R0=(R1+R2+R3)/3.

Also the present embodiment has been explained by an ink jet recording apparatus, but it is likewise applicable to other recording apparatus employing a recording head for example dot impact type or thermal transfer type.

Furthermore, the present embodiment reads the fixed original by moving the scanner unit 111 in the main scanning direction, but the original reading may also be achieved by fixing the scanner unit 111 and moving the original in the main scanning direction.

Furthermore, the original is moved in the sub scanning direction for overlapped reading of the band data, but it is also possible to fix the original and to move the scanner unit 111 in the sub scanning direction for achieving the overlapped reading.

Figure 8:
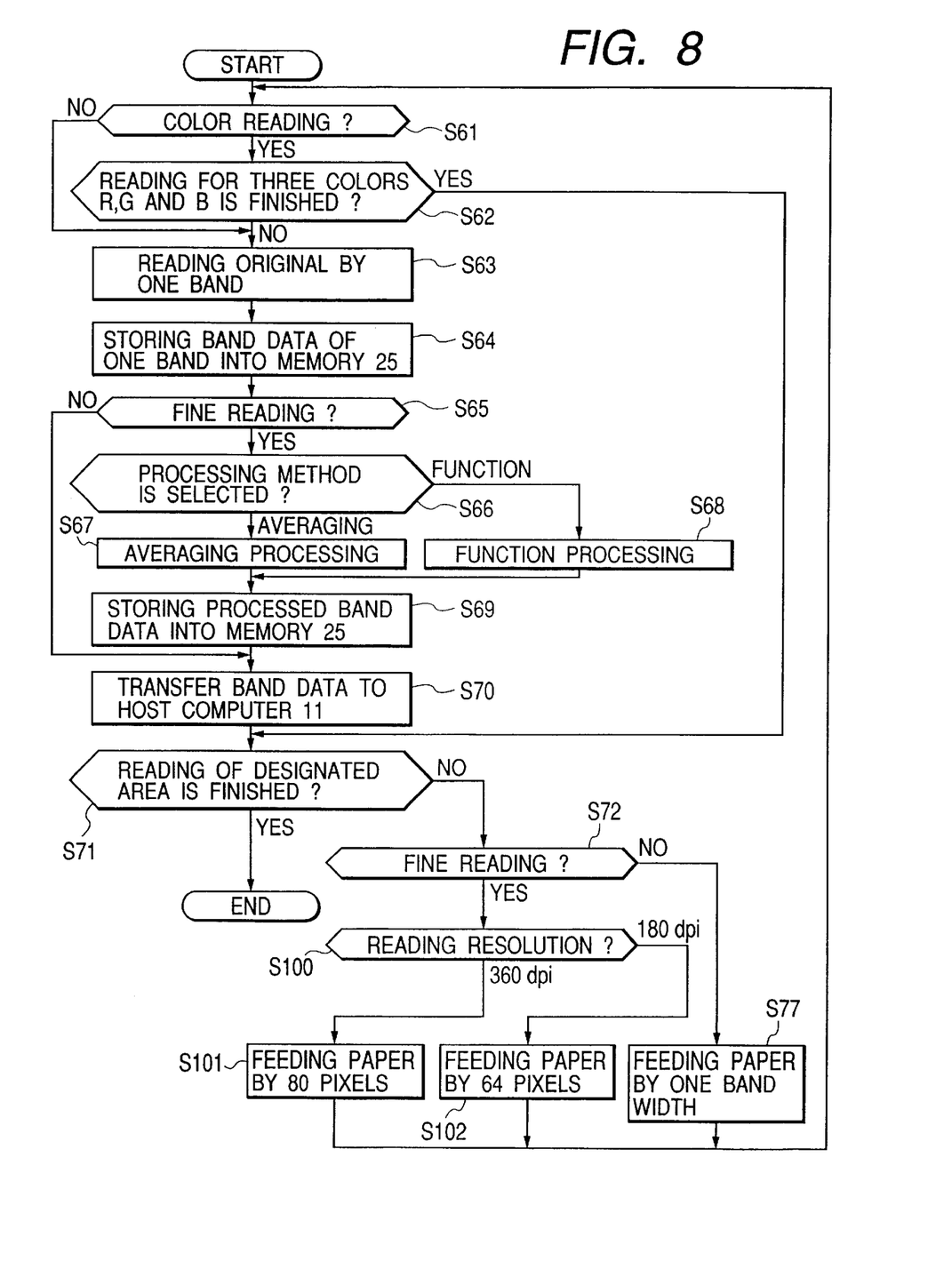
FIG. 8 is a flow chart showing the control sequence of image reading.

FIG. 8 is a flow chart showing a second embodiment of the present invention. In the foregoing first embodiment, the width of overlapped reading is controlled according to the original size and also according to whether the color image reading is executed. In the present embodiment, the width of overlapped reading is controlled according to the reading resolution.

In the flow chart shown in FIG. 8, the operations of the steps S61 to S72 are identical to those of the first embodiment shown in FIG. 6 and will not, therefore, be explained further.

In case the step S72 identifies that the fine reading is to be executed, there is detected the set reading resolution (step S100). The reading resolution is detected for the following reason.

In case of reading an original with a relatively low resolution, the capacity of the memory 25 required for storing the read image data becomes smaller in the case of image reading with a higher resolution. Therefore, the reading resolution is detected in order to control the reading process so as to fully exploit the margin in the memory capacity, resulting from the difference in the resolution.

It is assumed that the reading resolution can be set at either of two levels 180 dpi and 360 dpi. In case of reading the original with the resolution of 360 dpi, the width of overlapped reading in a band is selected as 48 pixels, but, in case of reading the original with the resolution of 180 dpi, the width is selected as 64 pixels. In this case there are considered certain predetermined reading resolutions, but there may also be adopted such control that the width of overlapped reading becomes larger as the reading resolution becomes lower.

Again referring to FIG. 8, if the step S100 identifies that the resolution is 360 dpi, a step S101 advances the original by 80 pixels and the sequence then returns to the step S61. If the step S100 identifies that the resolution is 180 dpi, a step S102 advances the original by 64 pixels and the sequence then returns to the step S61. If the step S72 identifies that the fine reading is not to be executed, the step S77 advances the original by a band width, because the overlapped reading is not executed, and the sequence then returns to the step S61.

The above-described control allows to achieve an image reading process of high quality, fully exploiting the margin in the memory capacity, resulting from the reading resolution.

As detailedly explained in the foregoing, a higher image quality can be realized by advancing the original with an advancing width smaller than the predetermined reading width and applying image processing to the image data contained in the overlapped portion between the preceding reading width and the current reading width.

As the image processing is selected from an averaging process or a function process on each color image data, it is possible to securely eliminate the bandwise fluctuation thereby realizing a higher quality in the image. The averaging process can reduce the noise level of the image by (dB)=10×log(n), wherein n indicates the number of overlapped readings. Consequently there can be obtained a high-quality image with a reduced noise level by executing the overlapped reading by a necessary number of times. Also in case of function process, it is possible to reduce the noise level according to the employed function, and to select the level of overlapped reading by preparing plural functions.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   a reading unit adapted to read the image on an original;
   a movement unit adapted to cause a relative movement of said reading unit and the original in such a manner that said reading unit reads the image on the original in overlapped manner;
   a setting unit adapted to set a reading color by said reading unit; and
   a control unit adapted to vary the range of overlapped reading by said reading unit, according to the reading color set by said setting unit.

2. An image reading apparatus according to claim 1, wherein said control unit is adapted to select a wider overlapped reading range in a case where monochromatic reading is set by said setting unit, in comparison with a case in which color reading is set.

3. An image reading apparatus according to claim 1, further comprising a memory adapted to store the image data of the original read by said reading unit.

4. An image reading apparatus according to claim 1, further comprising an image process unit adapted to apply a predetermined image process to the image data contained in an area of overlapped reading by said reading unit.

5. An image reading apparatus according to claim 4, wherein the image process is an averaging process or a function process on the image data.

6. An image reading apparatus according to claim 1, further comprising a mounting arrangement, by means of which said reading unit or a recording unit adapted to record image information on a recording sheet is selectively mountable.

7. An image reading apparatus comprising:
   a reading unit adapted to read the image on an original, said reading unit having a predetermined reading width;
   a discriminating unit adapted to discriminate the size of the original;
   a first movement unit adapted to cause a relative movement of said reading unit and the original in a sub-scanning direction so that said reading unit reads the image on the original in an overlapping manner;
   a second movement unit adapted to cause a relative movement between said reading unit and the original in a main scanning direction; and
   a control unit adapted to vary the range of overlapped reading by said reading unit, according to the size of the original discriminated by said discriminating unit.

8. An image reading apparatus according to claim 7, further comprising a memory adapted to store image data of the original read by said reading unit.

9. An image reading apparatus according to claim 7, further comprising an image process unit adapted to apply a predetermined image process to the image data contained in an area of overlapped reading by said reading unit.

10. An image reading apparatus according to claim 9, wherein the image process is an averaging process or a function process on the image data.

11. An image reading apparatus according to claim 7, further comprising a mounting arrangement, by means of which said reading unit or a recording unit adapted to record image information on a recording sheet is selectively mountable.

12. An image reading apparatus according to claim 7, wherein the range of overlapped reading is set according to the discriminated size of the original in a main scanning direction.

13. An image reading apparatus comprising:
   a reading unit adapted to read the image on an original, said reading unit having a predetermined reading width;
   a discriminating unit adapted to discriminate a reading mode of said reading unit, the reading mode being set according to the color of reading;
   a first movement unit adapted to cause a relative movement of said reading unit and the original in a sub-scanning direction by an amount smaller than said predetermined reading width;
   a second movement unit adapted to cause a relative movement between said reading unit and the original in a main scanning direction; and
   a control unit adapted to vary the amount of relative movement in said sub-scanning direction by said first movement unit, according to the reading mode discriminated by said discriminating unit.

14. An image reading apparatus according to claim 13, further comprising a memory adapted to store image data of the original read by said reading unit.

15. An image reading apparatus according to claim 13, further comprising an image process unit adapted to apply a predetermined image process to the image data contained in an area of overlapped reading by said reading unit.

16. An image apparatus according to claim 15, wherein the image process is an averaging process or a functioning process on the image data.

17. An image reading apparatus according to claim 13, further comprising a mounting arrangement, by means of which said reading unit or a recording unit adapted to record image information on a recording sheet is selectively mountable.

18. An image reading apparatus comprising:
   a reading unit adapted to read the image on an original, said reading unit having a predetermined reading width;
   a discriminating unit adapted to discriminate a reading mode of said reading unit, the reading mode being set according to the reading resolution;
   a first movement unit adapted to cause a relative movement of said reading unit and the original in a sub-scanning direction by an amount smaller than said predetermined reading width;
   a second movement unit adapted to cause a relative movement between said reading unit and the original in a main scanning direction; and
   a control unit adapted to vary the amount of relative movement in said sub-scanning direction by said first movement unit, according to the reading mode discriminated by said discriminating unit.

19. An image reading apparatus according to claim 18, further comprising a memory adapted to store image data of the original read by said reading unit.

20. An image reading apparatus according to claim 18, further comprising an image process unit adapted to apply a predetermined image process to the image data contained in an area of overlapped reading by said reading unit.

21. An image reading apparatus according to claim 20, wherein the image process is an averaging process or a function process on the image data.

22. An image reading apparatus according to claim 18, further comprising a mounting arrangement, by means of which said reading unit or a recording unit adapted to record image information on a recording sheet is selectively mountable.

23. An image reading method comprising the steps of:
   reading the image on an original by a reading unit;
   causing a relative movement of the reading unit and the original in such a manner that the reading unit reads the image on the original in overlapped manner;
   setting a reading color for reading by the reading unit; and
   controlling the range of overlapped reading by the reading unit, according to the reading color.

24. An image reading method comprising the steps of:
   reading the image on an original by a reading unit, the reading unit having a predetermined reading width;
   discriminating the size of the original;
   causing a first relative movement between the reading unit and the original in a sub-scanning direction so that said reading unit reads the image on the original in an overlapping manner;
   causing a second relative movement between the reading unit and the original in a main scanning direction; and
   varying the range of overlapped reading by said reading unit, according to the discriminated size of the original.

25. A memory medium storing a program, said program comprising:
   reading an image on an original by a reading unit;
   causing a relative movement of the reading unit and the original in such a manner that the reading unit reads the image on the original in overlapped manner;
   setting a reading color for reading by the reading unit; and
   varying the range of overlapped reading by the reading unit, according to the reading color.

26. A memory medium storing a program, said program comprising:
   reading an image on an original by a reading unit, the reading unit having a predetermined reading width;
   discriminating the size of the original;
   causing a first relative movement between the reading unit and the original in a sub-scanning direction so that said reading unit reads the image on the original in an overlapping manner;
   causing a second relative movement between the reading unit and the original in a main scanning direction; and
   varying the range of the overlapped reading by said reading unit, according to the discriminated size of the original.

27. An image reading method comprising the steps of:
   reading the image on an original by a reading unit, the reading unit having a predetermined reading width;
   discriminating a reading mode of the reading unit, the reading mode being set according to the color of reading;

causing a first relative movement between the reading unit and the original in the sub-scanning direction by an amount smaller than the predetermined reading width;

causing a second relative movement between the reading unit and the original in the main scanning direction; and varying the amount of the first relative movement in the sub-scanning direction, according to the discriminated reading mode.

28. A memory medium storing a program, said program comprising:

reading an image on an original by a reading unit, the reading unit having a predetermined reading width;

discriminating a reading mode of the reading unit, the reading mode being set according to the color of reading;

causing a first relative movement between the reading unit and the original in the sub-scanning direction by an amount smaller than the predetermined reading width;

causing a second relative movement between the reading unit and the original in the main scanning direction; and varying the amount of the first relative movement in the sub-scanning direction, according to the discriminated reading mode.

29. An image reading method comprising the steps of:

reading the image on an original by a reading unit, the reading unit having a predetermined reading width;

discriminating a reading mode of the reading unit, the reading mode being set according to the reading resolution;

causing a first relative movement between the reading unit and the original in the sub-scanning direction by an amount smaller than the predetermined reading width;

causing a second relative movement between the reading unit and the original in the main scanning direction; and varying the amount of the first relative movement in the sub-scanning direction, according to the discriminated reading mode.

30. A memory medium storing a program, said program comprising:

reading an image on an original by a reading unit, the reading unit having a predetermined reading width;

discriminating a reading mode of the reading unit, the reading mode being set according to the reading resolution;

causing a first relative movement between the reading unit and the original in the sub-scanning direction by an amount smaller than the predetermined reading width;

causing a second relative movement between the reading unit and the original in the main scanning direction; and varying the amount of the first relative movement in the sub-scanning direction, according to the discriminated reading mode.

* * * * *

UNITED STATES PATENT AND TRADEMARK OFFICE
CERTIFICATE OF CORRECTION

PATENT NO. : 6,603,572 B1
DATED : August 5, 2003
INVENTOR(S) : Akihiko Nakatani et al.

It is certified that error appears in the above-identified patent and that said Letters Patent is hereby corrected as shown below:

Column 2,
Line 6, "to an" should read -- to --.

Column 3,
Line 31, "effectiving" should read -- effecting --.

Column 4,
Line 28, "record" should read -- records --.

Column 5,
Line 15, "almost" should read -- almost the --.

Column 10,
Line 22, "in" should read -- in an --.

Column 11,
Line 43, "An image" should read -- An image reading --.

Signed and Sealed this

Eleventh Day of November, 2003

JAMES E. ROGAN
*Director of the United States Patent and Trademark Office*